United States Patent [19]

Kakimoto

[11] 4,392,640
[45] Jul. 12, 1983

[54] VIBRATION ABSORBER FOR AN AUTOMOTIVE VEHICLE

[75] Inventor: Toshihiko Kakimoto, Tokyo, Japan

[73] Assignee: Nissan Motor Co., Ltd., Yokohama, Japan

[21] Appl. No.: 253,570

[22] Filed: Apr. 13, 1981

[30] Foreign Application Priority Data

Apr. 21, 1980 [JP] Japan .................. 55-52664

[51] Int. Cl.$^3$ .............................. F16F 1/38
[52] U.S. Cl. ................................ 267/141.2
[58] Field of Search ........ 267/140, 140.5, 141.1–141.5

[56] References Cited

U.S. PATENT DOCUMENTS 1,571,713  2/1926  Emery .

FOREIGN PATENT DOCUMENTS

| 2240157 | 2/1974 | Fed. Rep. of Germany . |
| 1173461 | 2/1959 | France . |
| 1302704 | 7/1962 | France . |
| 1431821 | 2/1966 | France . |
| 2029015 | 10/1970 | France . |
| 2047901 | 3/1971 | France . |
| 2262231 | 9/1975 | France . |
| 2305646 | 10/1976 | France ............... 267/141.2 |
| 2378986 | 8/1978 | France . |
| 111638 | 8/1944 | Sweden ............... 267/141.3 |
| 904856 | 8/1962 | United Kingdom . |
| 2010438 | 6/1979 | United Kingdom . |

*Primary Examiner*—Duane A. Reger
*Attorney, Agent, or Firm*—Thompson, Birch, Gauthier & Samuels

[57] ABSTRACT

A vibration absorber for an automotive vehicle which can prevent the shuddering phenomenon even while the vehicle is gradually accelerated or decelerated. The rubber member thereof is provided with multistep elasticity characteristics such that a first shearing portion of the rubber member is first deformed in shear, a second shearing portion thereof is next deformed in shear, and the other portion thereof is lastly deformed under compression. To achieve the above-mentioned elasticity characteristics, some appropriately sized slots, cavities, or gaps are provided within the rubber member at appropriate positions within the rubber member.

4 Claims, 15 Drawing Figures

FIG.IO(A)
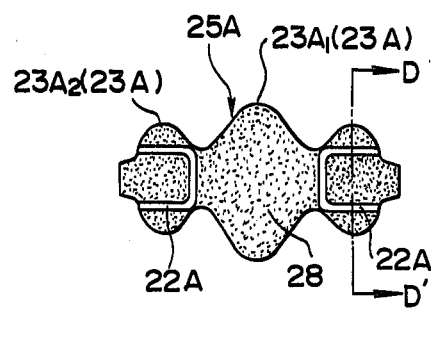
FIG.IO(B)
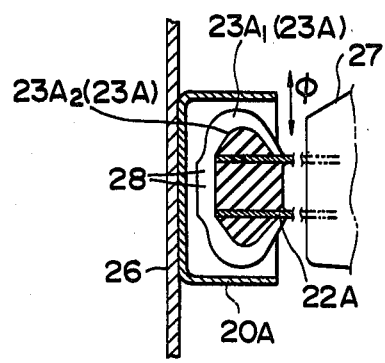
FIG.11
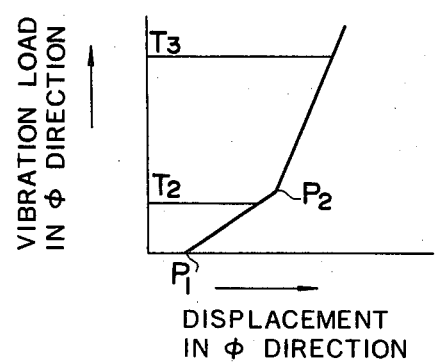

VIBRATION ABSORBER FOR AN AUTOMOTIVE VEHICLE

BACKGROUND OF THE INVENTION

1. Field of the Invention

The present invention relates to an improvement in the vibration absorber used for mounting a power unit (the engine and transmission together) in an automotive vehicle, and more specifically to the shapes of the rubber members used for the vibration absorber such that multistep vibration absorbing characteristics are provided, depending upon the shear and compression rates of deformation of the rubber member.

2. Description of the Prior Art

In order to absorb the vibration generated by the power unit of an automotive vehicle, there exist various vibration absorbers. In these prior-art vibration absorbers, usually two-step nonlinear vibration absorbing characteristics are required in order that the vibration is effectively damped by the shear deformation of the vibration absorbing rubber member when the vibration is relatively small and by the compression deformation thereof when the vibration is great. In this case however, since the vibration absorbing characteristics change abruptly, a sudden, unpleasant shock can be applied to the passengers.

Additionally, when the vehicle is gradually accelerated or decelerated, a certain amount of load is applied to the vibration absorber, and therefore small vibrations are transmitted to the vehicle body, since the rubber member is left deformed within the compression region beyond the shear region, thus resulting in a phenomenon called shuddering because the elasticity in the compression region is relatively great compared with that in the shear region.

A more detailed description of prior-art vibration absorbers will be made hereinafter with reference to FIG. 1 and FIG. 2.

SUMMARY OF THE INVENTION

With these problems in mind, therefore, it is the primary object of the present invention to provide a vibration absorber which avoids the occurrence of shuddering.

To achieve the above-mentioned object, the vibration absorber according to the present invention comprises a novel rubber member provided with a plurality of appropriate size slots, cavities, or gaps at appropriate positions within the rubber member.

The vibration absorber thus constructed has multistep vibration absorbing characteristics such that the rate of change of displacement of the rubber member is changed according to the load applied to the absorber, that is, the rubber member is deformed in dependence upon shear or upon compression deformation even within the compression region beyond the shear region.

BRIEF DESCRIPTION OF THE DRAWINGS

The features and advantages of the vibration absorber according to the present invention will be more clearly appreciated from the following description taken in conjunction with the accompanying drawings in which like reference numerals designate corresponding elements and in which:

FIG. 10(A) is a side view of a seventh embodiment of the present invention;

FIG. 10(B) is a cross-sectional view taken along the line D-D' of FIG. 10(A); and FIG. 11 is a diagram showing the characteristics of the vibration absorber shown in FIGS. 9 and 10 with displacement in the $\phi$ direction along the abscissa and with vibration in the $\phi$ direction along the ordinate.

DETAILED DESCRIPTION OF THE PREFERRED EMBODIMENTS

To facilitate understanding of the present invention, a brief reference will be made hereinbelow to prior-art vibration absorbers for automotive vehicles.

Figure 1:
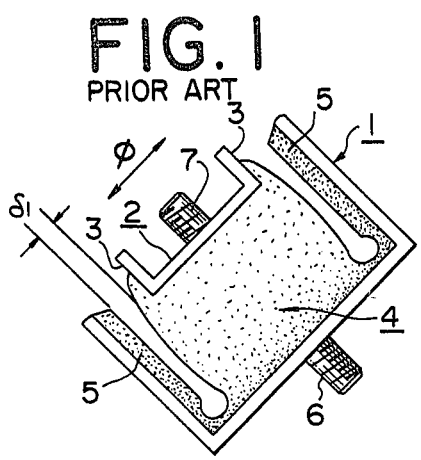
FIG. 1 is a plan view of a prior-art vibration absorber.

FIG. 1 shows a prior-art vibration absorber which includes a first member 1, a second member 2, and a rubber member 4. The first member 1 is formed of a metal plate roughly in a U-shape. The second member 2 is formed of the same metal plate roughly in the same U-shape, having a pair of vibration-receiving portions 3 in the direction from which vibration is applied, and is disposed between the first and second members with the rubber member 4 therebetween. The rubber member 4 is provided with a pair of clefts $\delta_1$ starting at the vibration-receiving portions 3 of the second member 2 along the inner surfaces of the first member 1. The first member 1 is fixed onto a vehicle body (not shown) by a studbolt 6 and the second member 2 is fixed to a power unit (not shown) by another studbolt 7. In this case, when the vibration-receiving portions 3 of the second member 2 are moved by vibration in the $\phi$ direction, the rubber member 4 is deformed in shear until the sides of the rubber member 4 are brought into contact with the opposite sides 5 of the rubber member 4 to serve as a damper depending upon compression.

Figure 2:
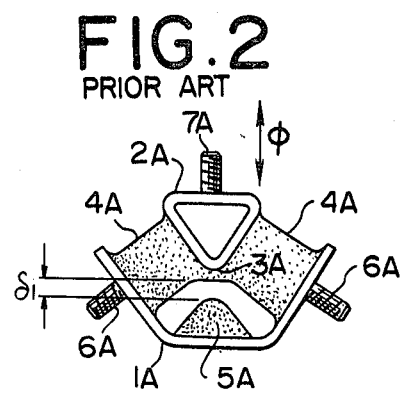
FIG. 2 is a plan view of another prior-art vibration absorber.

FIG. 2 shows another prior-art vibration absorber which includes a first member 1A, a second member 2A and rubber members 4A and 5A. The first member 1A is formed roughly in a wide U-shape. The second member 2A is formed in a triangle shape, having a vibration-receiving portion 3A in the direction in which vibration is applied, and is disposed between the first and second members with the rubber member 4A therebetween. The rubber member 5A is disposed with a gap $\delta_1$ across from the vibration-receiving portion 3A. The first member 1A is fixed to a vehicle body (not shown) by a studbolt 6A, and the second member 2A is fixed to a power unit (not shown) by another studbolt 7A. In this case, when the vibration-receiving portion 3A of the second member 2A is moved by the vibration applied in the $\phi$ direction, the rubber member 4A deforms in shear until it is brought into contact with the rubber member 5A to serve as a damper depending upon compression.

Figure 3:
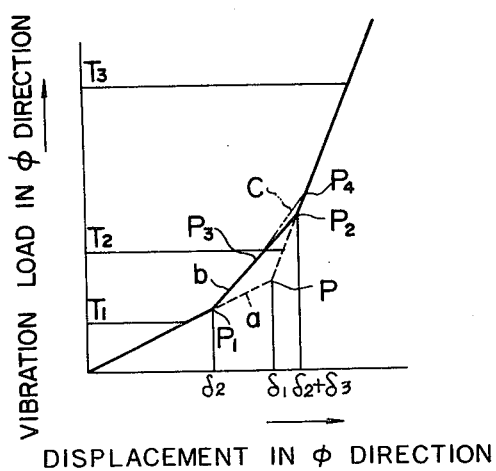
FIG. 3 is a diagram showing the characteristics of a vibration absorber with displacement of the $\phi$ direction along the abscissa and with vibration in the $\phi$ direction along the ordinate.

In these prior-art vibration absorbers however, as can be seen from the dashed line a in FIG. 3, when the vibration is small in the $\phi$ direction ($T_1$ in FIG. 3), that is, when the rubber member 4 or 4A is not in contact with the rubber member 5 or 5A, the vibration is damped by shear deformation of low elasticity caused by deforming the rubber member 4 or 4A in shear. On the other hand, when the vibration is large ($T_3$ in FIG. 3), that is, when the rubber member 4 or 4A is in contact with the rubber member 5 or 5A after the shearing, the vibration is damped by compression of higher elasticity caused by deforming the rubber member 5 or 5A in compression. In other words, the vibration absorber serves as a damper to absorb the relatively great vibration generated by the power unit, and nonlinear vibration characteristics required for a vibration absorber are attained.

Although such nonlinear vibration absorber characteristics are obtainable in this case, since the characteristics of the damper change relatively sharply at point P as described hereinabove, a sudden, unpleasant shock is applied to the passengers. Additionally, when the vehicle is gradually accelerated or decelerated, as shown by $T_2$ in FIG. 3, some large load is applied to the vibration absorber, and therefore a small vibration is transmitted to the vehicle body when the rubber member 4 or 4a is brought into contact with or forced against the rubber member 5 or 5A, that is, when the rubber member 4 or 4A is deformed in compression. Under this condition, since the elasticity of the vibration absorber is great, the vibration is not damped and is transmitted to the vehicle body, thus resulting in a phenomenon called shuddering.

Figure 4:
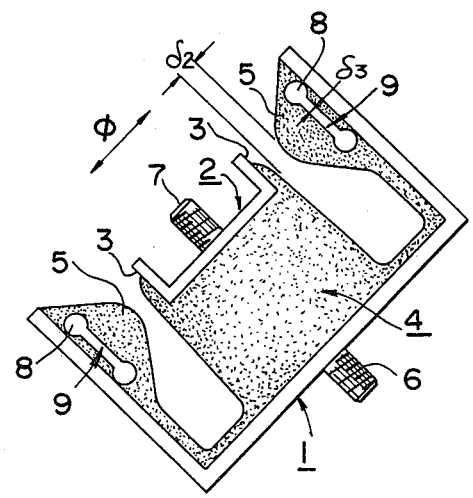
FIG. 4 is a plan view of a first embodiment of the present invention.

In view of the above description, reference is now made to FIGS. 4 to 10, and more specifically to FIG. 4.

Reference is now made to FIG. 4, in which is shown a first preferred embodiment of the present invention, indicating an improvement in the prior-art vibration absorber of FIG. 1.

In the embodiment of FIG. 4, a second member 2 is connected to a U-shaped first member 1 by a rubber member 4 disposed therebetween in the middle of the first member 1. The rubber member 4 is provided with a pair of clefts $\delta_2$ starting at the pair of vibration-receiving portions 3 of the second member 2 along the inner surfaces of the first member 1, and serves as a stopper in the direction in which vibration is applied. In this rubber member 5, a pair of elasticity change portions 9 consisting of dumbbell shaped slots composed of two holes 8 connected by a straight gap $\delta_3$ is formed in order that the damping function of the rubber member 5 has two-step characteristics including shear elasticity and compression elasticity, as shown by the solid line b in FIG. 3.

Figure 5:
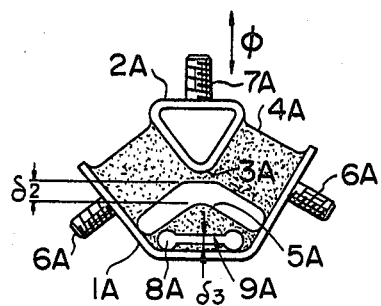
FIG. 5 is a plan view of a second embodiment of the present invention.

In the second embodiment of FIG. 5, a triangle-shaped second member 2A is connected to a wide U-shaped first member 1A by a rubber member 4A disposed therebetween in the middle of the first member 1A, with the apex 3A of the triangle directed toward the apex of another rubber member 5A to absorb vibration. Between the rubber members 4A and 5A, there is provided a gap $\delta_2$ to serve as a damper in the direction in which vibration is applied. In the rubber member 5A, an elasticity change portion 9A consisting of a dumbell shaped slot composed of two holes 8A connected by a straight gap $\delta_3$ is formed in order that the damping function of the rubber member 5A has two-step characteristics including shear elasticity and compression elasticity in the same way as in the embodiment shown in FIG. 4.

That is to say, in these embodiments, the rubber member 5 or 5A which serves as a damper deforms under low elasticity in shear against the vibration applied in the $\phi$ direction until the gap 8 or 8A is completely closed (within the range from $P_1$ to $P_2$ in FIG. 3). After that, the rubber member 5 or 5A deforms under high elasticity in compression (from $P_2$ in FIG. 3).

Therefore, when the vibration absorber thus constructed is used to mount a power unit by connecting the first member 1 or 1A to the vehicle body (not shown) by the studbolts 6 or 6A and the second member 2 or 2A to the power unit (not shown) by the other studbolt 7 or 7A, and when a large vibration is applied in the $\phi$ direction in such a case as when the vehicle is suddenly accelerated or decelerated, the rubber member 4 or 4A between the first member 1 or 1A and the second member 2 or 2A first deforms in shear and then deforms in compression depending upon the damping effect of the other rubber member 5 or 5A. Accordingly, it is possible to prevent the occurrence of a sudden shock by reducing the change of gradient of the elasticity characteristics. In addition, in such a case as when the vehicle is gradually accelerated or decelerated, a relatively great load is applied to the vibration absorber, and a constant vibration is applied thereto within the range where the gap $\delta_2$ is closed but the gap 8 or 8A still remains open ($T_2$ in FIG. 3). In this condition, however, since the rubber member 5 or 5A is under a low elasticity condition, the vibration from the power unit is absorbed by the deformation in shear of the rubber member 5 or 5A, thus the occurrence of the shuddering phenomenon is prevented.

Figure 6:
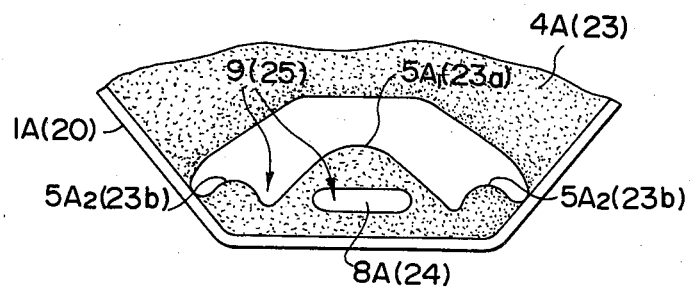
FIG. 6 is a fragmentary enlarged plan view of a third embodiment of the present invention.

FIG. 6 shows a third preferred embodiment of the present invention. Although embodiments in which two-stage elasticity characteristics are provided for the rubber member 5 or 5A have been described, it is possible to provide three-step nonlinear elasticity characteristics. For instance, in the case shown in FIG. 6, a plurality of rubber projections with different projection height are formed in the rubber member 5A, and a gap 8A is provided in the largest rubber projection $5A_1$, so that a difference in projection height is produced between the rubber members $5A_1$ and $5A_2$ even after the gap 8A has been closed. In this case, the elasticity characteristics have three-step characteristics as depicted by the dot-dot-dash line c in FIG. 3: the range from $P_1$ to $P_3$ based on shear until the gap 8A in the rubber member $5A_1$ is closed, the range from $P_3$ to $P_4$ based on the compression of the rubber member $5A_1$, and the range from $P_4$ based on the compression of both rubber members $5A_1$ and $5A_2$.

Figures 7A, 7B:
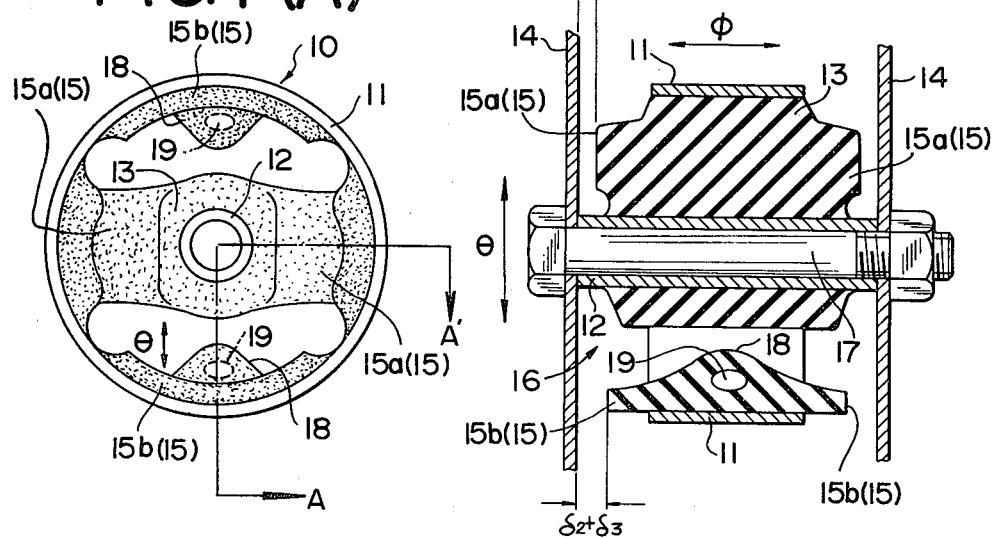
FIG. 7(A) is a front view of a fourth embodiment of the present invention.
FIG. 7(B) is a cross-sectional view taken along the lines A-A' of FIG. 7(A)

FIGS. 7(A) and 7(B) show a fourth preferred embodiment where the first member is an outer cylindrical body 11 and the second member is spool-shaped body including an inner cylinder 12 and a pair of plate members 14 connected to the inner cylinder 12 by a shaft 17. The rubber member 13 is disposed between the outer cylindrical body 11 and the inner cylinder 12 with spaces between the sides of the rubber member 13 and the inner surfaces of the plate members 14.

The rubber member 13 includes an arm member fixed to the inner cylinder 12 and a tubular member fixed to the outer cylinder body 11. In this rubber member 13, a pair of radially intermediate portions 15a of the arm member have an axial dimension greater than that of other portions of the arm member; the radially outer portions 15b of the tubular member have an axial dimension less than that of the radially intermediate portions 15a and greater than that of the other portions of the arm member. Further, a pair of projections 18 extending from the tubular member inwardly are arranged diametrically opposed in a direction substantially perpendicular to the arm member direction.

In this embodiment, the rubber member 13 forms an elasticity change portion 16 on side projections 15a of the rubber member 13 placed between the outer and inner cylinders 11 and 12 and on other side projections 15b provided on the outer cylinder 11. The clearance between the rubber member 15a and the second member 14 is preset to $\delta_2$, and the clearance between the rubber member 15b and the second member 14 is preset to $\delta_2 + \delta_3$ for deformation in the axial direction of the shaft 17.

When this vibration absorber 13 is used to mount a power unit by connecting the first member 11 to the power unit (not shown) and the second member 14 to the vehicle body (not shown) in the same way as in the previously described embodiments, it is possible to obtain two-step elasticity characteristics. That is to say, first the rubber member 13 deforms under shear due to vibration in the $\phi$ direction because the outer cylinder 11 of the first member deforms toward the second member 14, next the rubber member 13 is brought into contact with the side of the second member 14 to produce a damping effect. In this case, first the larger projection 15a of the rubber member 13 is brought into contact with the side of the second member 14 and deforms under shear along a gentle gradient corresponding to $P_1$ to $P_2$ in FIG. 3; next the smaller projection 15b of the rubber member 13 is brought into contact with the side of the second member 14 and deforms under shear along a sharp gradient corresponding to $P_2$ and after in FIG. 3.

Additionally in this embodiment, since another pair of rubber members 18 are provided inside the outer cylinder 11 in order to supply a damping function against vibration in the $\theta$ direction, it is also possible to provide two-step elasticity characteristics in the $\theta$ direction by making a cavity 19 in the rubber member 18 so that the rubber member 18 deforms under both shear and compression.

Figure 8A:
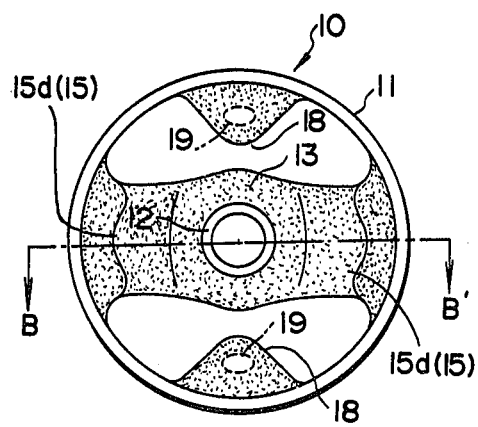
FIG. 8(A) is a front view of a fifth embodiment of the present invention.
Figure 8B:
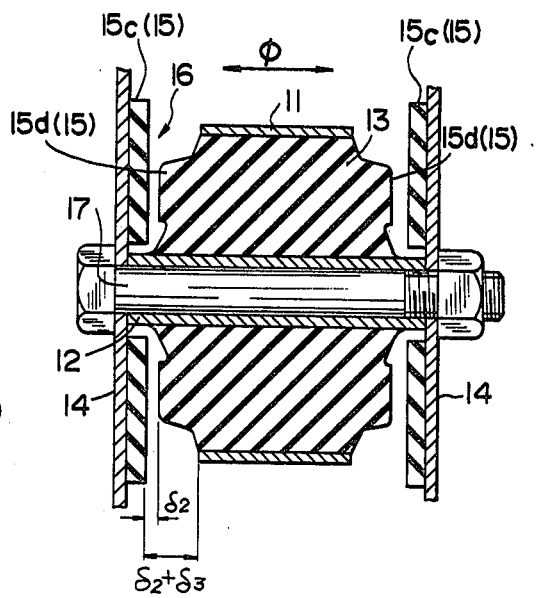
FIG. 8(B) is a cross-sectional view taken along the line B-B' of FIG. 8(A)

FIGS. 8(A) and 8(B) show a fifth embodiment in which the rubber member 13 providing a damping function includes a pair of flat rubber members 15c disposed on the inner surfaces of a pair of second members 14 against the sides of an outer cylinder 11, and a rubber member 15d projecting from the sides of a rubber member 13 placed between an inner cylinder 12 and the outer cylinder 11. the clearance between the rubber member 15c and the rubber member 15d is preset to $\delta_2$; the clearance between the rubber member 15c and the outer cylinder 11 is preset to $\delta_2 + \delta_3$.

In this embodiment, the relative displacement of the outer cylinder 11 of a first member from the second member 14 caused by vibration in the $\phi$ direction produces a damping function when the rubber member 15d is brought into contact with the rubber member 15c attached to the second member 14, after the rubber member 13 disposed between the outer cylinder 11 and the inner cylinder 12 has been deformed under shear. That is to say, it is possible to obtain two-step elasticity characteristics such that first the rubber member 15d deforms under shear along a gentle gradient corresponding to $P_1$ to $P_2$ in FIG. 3; next the rubber member 15d is brought into contact with the rubber member 15c and deforms under compression along a sharp gradient corresponding to $P_2$ and after in FIG. 3.

Figure 9A:
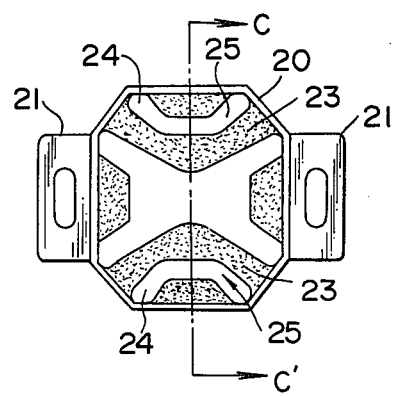
FIG. 9(A) is a front view of a sixth embodiment of the present invention.
Figure 9B:
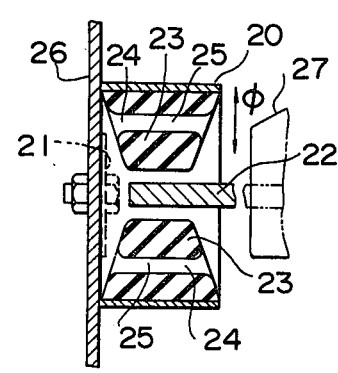
FIG. 9(B) is a cross-sectional view taken along the line C-C' of FIG. 9(A)

FIGS. 9(A) and 9(B) show a sixth embodiment used for absorbing the vertical vibration of a power unit.

In the embodiment of FIG. 9, a first member 20 is an octagonal cylinder fixed to the vehicle body 26 by a pair of brackets 21 provided on opposite sides thereof. A second member 22 is a flat-shaped arm fixed to the power unit by another bracket 27 with the free end of the second member 22 being suspended at the center of the first member 20. A pair of rubber members 23 to absorb vibration in the $\phi$ direction are provided on either the first member 20 or the second member 22 (on the inner wall of the first member 20 in this embodiment) facing the second member 22 and having an elasticity change portion 25 including a gap 24 within the rubber member 23. The rubber members 23 are large, truncated, and pyramid-shaped and each have a gap or slot 24 within them. The rubber members are arranged diametrically opposed in a first radial direction of the octagonal cylinder. A pair of small, truncated, pyramid-shaped rubber members are arranged diametrically opposed in a second radial direction of the octagonal cylinder substantially perpendicular to the first radial direction with a greater clearance between the apexes of the small pyramid-shaped rubber members than between the apexes of the larger rubber members 23.

Accordingly, in this embodiment, when vibration in the $\phi$ direction is applied by the power unit through the bracket 27, vibration is applied to the rubber member 23 through the second member 22. The rubber member 23 deforms under shear until the gap 24 is closed, along a gentle gradient corresponding to $P_1$ to $P_2$ in FIG. 11, and next deforms under compression, along a sharp gradient corresponding to $P_2$ and after in FIG. 11, thus providing two-step elasticity characteristics to prevent either shock or the shuddering phenomenon.

Further, in this embodiment, when the rubber member 23 is constructed in such a way that a plurality of projections with different projection rates are provided therein and another gap 24 is provided in the largest projection 23a as depicted in FIG. 6 by using the reference numerals in parentheses, since the compression differs between the rubber members 23a and 23b after the gap 24 has closed, it is possible to provide three-step nonlinear elasticity characteristics.

FIGS. 10(A) and 10(B) show a seventh embodiment. In this embodiment, a pair of U-shaped second members 22A are placed within a first member 20A with their backs facing each other separated by an appropriate distance, and are connected by a rubber member 28 having two symmetrical large rubber projections 23A$_1$ at the middle thereof and four symmetrical small rubber projections 23A$_2$ near the pair of U-shaped members 22A, so that the rubber members 23A are provided with the elasticity change portion 23A due to shear.

Accordingly, in this embodiment, when vibration in the $\phi$ direction is generated between the first member 20A and the second member 22A, first the rubber member 23A$_1$ is brought into contact with the first member 20A and the rubber member 28 deforms under shear, in addition to the local compression of the rubber member 23A$_1$, a gentle gradient corresponding to P$_1$ to P$_2$ in FIG. 11, and next the pair of rubber members 23A$_2$ additionally deforms under compression when greater vibration is generated, along a sharp gradient corresponding to P$_2$ and after in FIG. 11, thus providing two-step elasticity characteristics.

As described hereinabove, in the vibration absorber for mounting a power unit according to the present invention, since multistep elasticity characteristics are provided in dependence upon the shear and compression of the rubber member even while a medium frequency vibration is applied to the absorber, it is possible to realize the practical effect such that the vibration is appropriately and effectively damped, without producing shuddering, even while the vehicle is gradually accelerated or decelerated.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A vibration absorber adapted to be disposed between the body and the power unit of an automotive vehicle, comprising:
   (a) a spool-shaped body having an inner cylinder with a pair of axially spaced plate members fixedly joined thereto;
   (b) an outer cylinder having a diameter larger than that of said inner cylinder and being disposed concentrically with said inner cylinder; and
   (c) a rubber member, having: (i) a tubular portion which is fixed to the interior of said outer cylinder, (ii) an arm which is fixed to said inner cylinder and which extends radially therefrom in opposite directions to said tubular portion, said arm having radially intermediate portions with axial dimensions greater than that of the remainder of the arm but less than the axial spacing between said plate members, said arm being further provided with a pair of radially outer portions having axial dimensions less than that of the remaining portions of the arm; and (iii) a pair of diametrically opposed projections extending inwardly from the tubular portion in a direction substantially perpendicular to the radial disposition of said arm with the inner ends of said projections being spaced from said arm, said rubber member being adapted to deform in a way such that when said spool-shaped body vibrates radially in directions transverse to that of said arm, said arm is deformed in a shear mode prior to contacting said projections and said projections are deformed in a compression mode when contacted by said arm, and when said spool-shaped body vibrates in the axial direction, said arm is deformed in a shear mode prior to contacting said plate members, and in a compression mode when said radially intermediate portions contact said plate members;
   whereby multistep elasticity characteristics can be obtained in both the radial and axial vibration directions of said spool-shaped body.

2. A vibration absorber for an automotive vehicle as set forth in claim 1, further comprising a pair of flat rubber members fixed to said plate members in a way such that the radially intermediate portions of the arm member can be brought into contact with said rubber members when there is sufficient vibration in the axial direction of said spool-shaped body.

3. A vibration absorber adapted to be disposed between the body and the power unit of an automotive vehicle, comprising:
   (a) an octagonal cylinder;
   (b) a flat arm having a free end surrounded by and spaced inwardly from the inner surfaces of said octagonal cylinder at the center thereof;
   (c) a pair of diametrically opposed truncated, pyramid-shaped first rubber members each having an internal gap, said first rubber members extending inwardly from said octagonal cylinder towards said arm and with the apexes of said first rubber members defining a clearance therebetween, said first rubber members being adapted when contacted by said arm to deform in a shear mode prior to said gaps being closed and in a compression mode after said gaps are closed; and
   (d) a pair of diametrically opposed pyramid-shaped second rubber members extending inwardly from said octagonal cylinder towards said arm in a direction substantially perpendicular to that of said first rubber members, the apexes of said second rubber members having a clearance therebetween greater than that existing between the apexes of first rubber members, said second rubber members being adapted when contacted by said arm to deform only in a compression mode,
   whereby multistep elasticity characteristics can be obtained in one radial direction.

4. A vibration absorber for an automotive vehicle disposed between a vehicle body and a power unit, which comprises:
   (a) a first U-shaped member;
   (b) a pair of second U-shaped members; and
   (c) a rubber member having two symmetrical first projections at its middle, one on either side surface thereof, and four symmetrical second projections, one on each side of each first projection, said second U-shaped members being implanted within said rubber member, a second U-shaped member being arranged between two of the second projections on each side of said rubber member, said rubber member being disposed within said first U-shaped member with an appropriate distance therebetween, said first projections being first deformed in a compression mode when the vibration is small and the second projections being deformed also in a compression mode when the vibration is greater;
   whereby multistep elasticity characteristics can be obtained in one direction.

* * * * *